US00RE47405E

(19) United States
(12) Reissued Patent
Hall et al.

(10) Patent Number: US RE47,405 E
(45) Date of Reissued Patent: May 28, 2019

(54) DOWNHOLE TOOL PISTON ASSEMBLY

(71) Applicant: SCHLUMBERGER TECHNOLOGY CORPORATION, Sugar Land, TX (US)

(72) Inventors: David R. Hall, Provo, UT (US); Jonathan Marshall, Provo, UT (US)

(73) Assignee: SCHLUMBERGER TECHNOLOGY CORPORATION, Houston, TX (US)

(21) Appl. No.: 15/164,663

(22) Filed: May 25, 2016

Related U.S. Patent Documents

Reissue of:
(64) Patent No.: 9,085,941
Issued: Jul. 21, 2015
Appl. No.: 13/370,644
Filed: Feb. 10, 2012

(51) Int. Cl.
*E21B 17/10* (2006.01)
*E21B 7/06* (2006.01)
*E21B 27/00* (2006.01)
*E21B 10/62* (2006.01)

(52) U.S. Cl.
CPC ..... *E21B 17/1014* (2013.01); *E21B 7/06* (2013.01); *E21B 10/62* (2013.01); *E21B 27/00* (2013.01)

(58) Field of Classification Search
CPC ..... E21B 17/1014; E21B 10/62; E21B 7/06; E21B 27/00; F02B 23/0627
See application file for complete search history.

(56) References Cited

U.S. PATENT DOCUMENTS 4,117,897 A * 10/1978 Lloyd ..... 175/106
4,947,944 A * 8/1990 Coltman et al. ..... 175/73
5,511,627 A * 4/1996 Anderson ..... 175/73
5,553,678 A 9/1996 Barr et al.
6,550,548 B2 4/2003 Taylor
7,849,936 B2 * 12/2010 Hutton ..... 175/61
8,087,479 B2 1/2012 Kulkarni et al.
8,141,657 B2 * 3/2012 Hutton ..... 175/61
8,205,686 B2 6/2012 Beuershausen
2004/0206549 A1 10/2004 Dewey et al.
2004/0222022 A1 * 11/2004 Nevlud et al. ..... 175/57
2006/0157283 A1 7/2006 Hart
2007/0145131 A1 * 6/2007 Perkin et al. ..... 235/385
2008/0000693 A1 1/2008 Hutton
2009/0044979 A1 2/2009 Johnson et al.
2009/0133931 A1 5/2009 Rolovic
2009/0223716 A1 * 9/2009 Eppink ..... 175/25
2009/0223717 A1 * 9/2009 Eppink ..... 175/25
2009/0277689 A1 * 11/2009 Lee ..... 175/57
2010/0071962 A1 3/2010 Beuershausen
2010/0139980 A1 6/2010 Neves et al.
2011/0162890 A1 7/2011 Radovan
2012/0061148 A1 * 3/2012 Clausen et al.
2012/0168229 A1 * 7/2012 Lee ..... 175/265
2013/0206390 A1 * 8/2013 Hall et al. ..... 166/107

* cited by examiner

*Primary Examiner* — Catherine S Williams

(74) *Attorney, Agent, or Firm* — Ray Quinney & Nebeker P.C.; Paul N. Taylor

(57) ABSTRACT

A piston assembly may comprise a housing with a wall, and at least one chamber formed in the wall. A piston may be disposed within the chamber and at least one passageway may pass through the piston. At least one pin may be disposed within the passageway and attached to the chamber, and the piston may be free to translate relative to the pin.

44 Claims, 15 Drawing Sheets

DOWNHOLE TOOL PISTON ASSEMBLY

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*Notice: More than one reissue application has been filed for the reissue of U.S. Pat. No. 9,085,941. The reissue applications are application Ser. No. 15/164,663 (the present application), and Ser. No. 16/150,875. The present application is a reissue of U.S. Pat. No. 9,085,941. Ser. No. 16/150,875 is divisional reissue of U.S. Pat. No. 9,085,941.*

*CROSS-REFERENCE TO RELATED APPLICATIONS*

*This application is a reissue of U.S. Pat. No. 9,085,941, issued on Jul. 21, 2015. This application is also a reissue application of U.S. Pat. No. 9,085,941, issued on Jul. 21, 2015.*

BACKGROUND OF THE INVENTION

The present invention relates to the fields of downhole oil, gas, and/or geothermal exploration and more particularly to piston assemblies for actuating downhole tools. There exists in the art a variety of downhole tools comprising piston assemblies configured to actuate downhole tools to protrude and retract. One such downhole tool may be a directional steering mechanism. In directional drilling operations, a piston may extend a pad that contacts a formation and causes the drill string to move in a direction. Other such tools include expandable tools configured to enlarge the diameter of a wellbore and/or stabilize a drill string. The expandable tools may contain arms or blades which extend from the sides of the drill string and contact the formation. Examples from the prior art of such piston assemblies used in downhole tools are given below.

U.S. Patent Publication No. 2010/0071962 to Beuershausen, which is herein incorporated by reference for all that it contains, discloses a drill bit that includes at least one blade profile having a side section and an adjustable pad on the side section that is configured to extend from the side section to cause the drill bit to alter a drilling direction when the drill bit is used to drill a wellbore.

U.S. Patent Publication No. 2010/0139980 to Neves et al., which is herein incorporated by reference for all that it contains, discloses a ball piston steering device and methods for use of ball piston devices. One aspect of the invention includes: a sleeve in fluid communication with a fluid source and a ball received within the sleeve. The ball is movable within the sleeve from a recessed position and an extended position.

U.S. Patent Publication No. 2006/0157283 to Hart, which is herein incorporated by reference for all that it contains, discloses a bias unit comprising at least one bias pad moveable by a piston between retracted and extended positions wherein the piston is of non-circular effective cross-sectional shape.

U.S. Patent Publication No. 2004/0206549 to Dewey et al., which is herein incorporated by reference for all that it contains, discloses a downhole tool that functions as an underreamer or as a stabilizer in an underrreamed borehole. The tool includes one or more moveable arms disposed within a body having a flowbore therethrough in fluid communication with the wellbore annulus. The tool alternates between collapsed and expanded positions in response to differential fluid pressure between the flowbore and the wellbore annulus. In one embodiment, the tool moves automatically in response to differential pressure. In a second embodiment, the tool must be selectively actuated before it is moveable. The tool may include borehole engaging pads that comprise cutting structure or wear structures or both, depending upon the junction of the tool.

Despite the advancements as shown in the prior art, it is believed that there is still a need to develop improved piston assemblies used in downhole drill strings.

BRIEF SUMMARY OF THE INVENTION

In one aspect of the present invention, a piston assembly may comprise a housing with a wall, and at least one chamber formed in the wall. A piston may be disposed within the chamber and at least one passageway may pass through the piston. At least one pin may be disposed within the passageway and be attached to the chamber, and the piston may be free to translate relative to the pin.

The housing may be selected from a group consisting of drill bits, calipers, reamers, shock absorbers, jars, clamps, tractors, stabilizers, fishing tools, and combinations thereof. When the housing consists of a drill bit, the wall and the chamber may be disposed on a gauge surface of the drill bit. The housing may comprise a tube and the wall may be disposed within or on a surface of the tube. The chamber may be in fluid communication with a fluid source.

The chamber may comprise a cross section selected from the group consisting of a circle, oval, polygon, star, rectangle with circular ends, and annulus. The chamber may be lined with a sleeve and the chamber and the sleeve may comprise openings to allow passage of the at least one pin. The chamber openings may also allow fluid communication with the chamber. A seal may be disposed between the chamber and the piston, the piston and the sleeve, or the chamber and the sleeve.

The piston may comprise a cross sectional shape similar to the chamber. The piston may comprise a working surface adjacent the wall, a base surface opposite the working surface, and an intermediate surface joining the working surface and the base surface. The working surface may comprise wear resistant elements disposed thereon. The base surface may be nonplanar and comprise a topography selected from the group consisting of grooves, dimples, flutes, fins, troughs, and protrusions. The base surface may also comprise an opening to the passageway. The passageway may intersect at least one of the intermediate surface and the base surface.

The pin may comprise a cross section selected from the group consisting of a circle, oval, polygon, star, rectangle with circular ends, and annulus. The pin may also comprise a sleeve surrounding at least a portion of the pin, and an aperture there through. The passageway may comprise a cross-sectional area greater than a cross-sectional area of the pin.

DETAILED DESCRIPTION OF THE INVENTION AND THE PREFERRED EMBODIMENT

Figure 1:
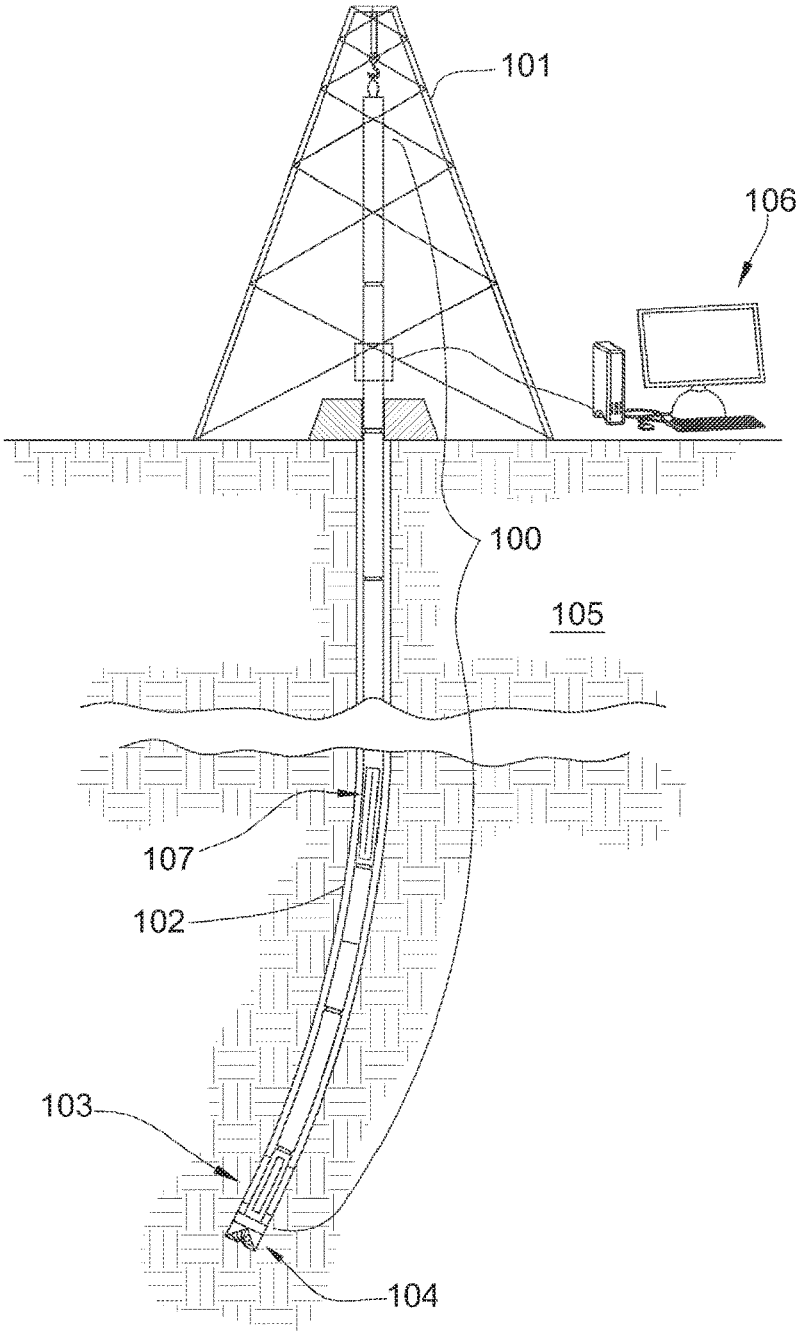
FIG. 1 is an orthogonal view of an embodiment of a drilling operation.

Referring now to the figures, FIG. 1 discloses an embodiment of a drilling operation comprising a downhole tool string 100 suspended by a derrick 101 in a wellbore 102. A steering assembly 103 may be located at the bottom of the wellbore 102 and may comprise a drill bit 104. As the drill bit 104 rotates downhole, the downhole tool string 100 may advance farther into a subterranean formation 105. The steering assembly 103 may be adapted to steer the drill string 100 in a desired trajectory. The drill string 100 may also comprise other tools 107. The tools 107 may be expandable tools used for enlarging the wellbore 102 or stabilizing the drill string 100 in the formation 105. The downhole tool string 100 may comprise electronic equipment able to send signals through a data communication system to a computer or data logging system 106 located at the surface.

Figure 2:
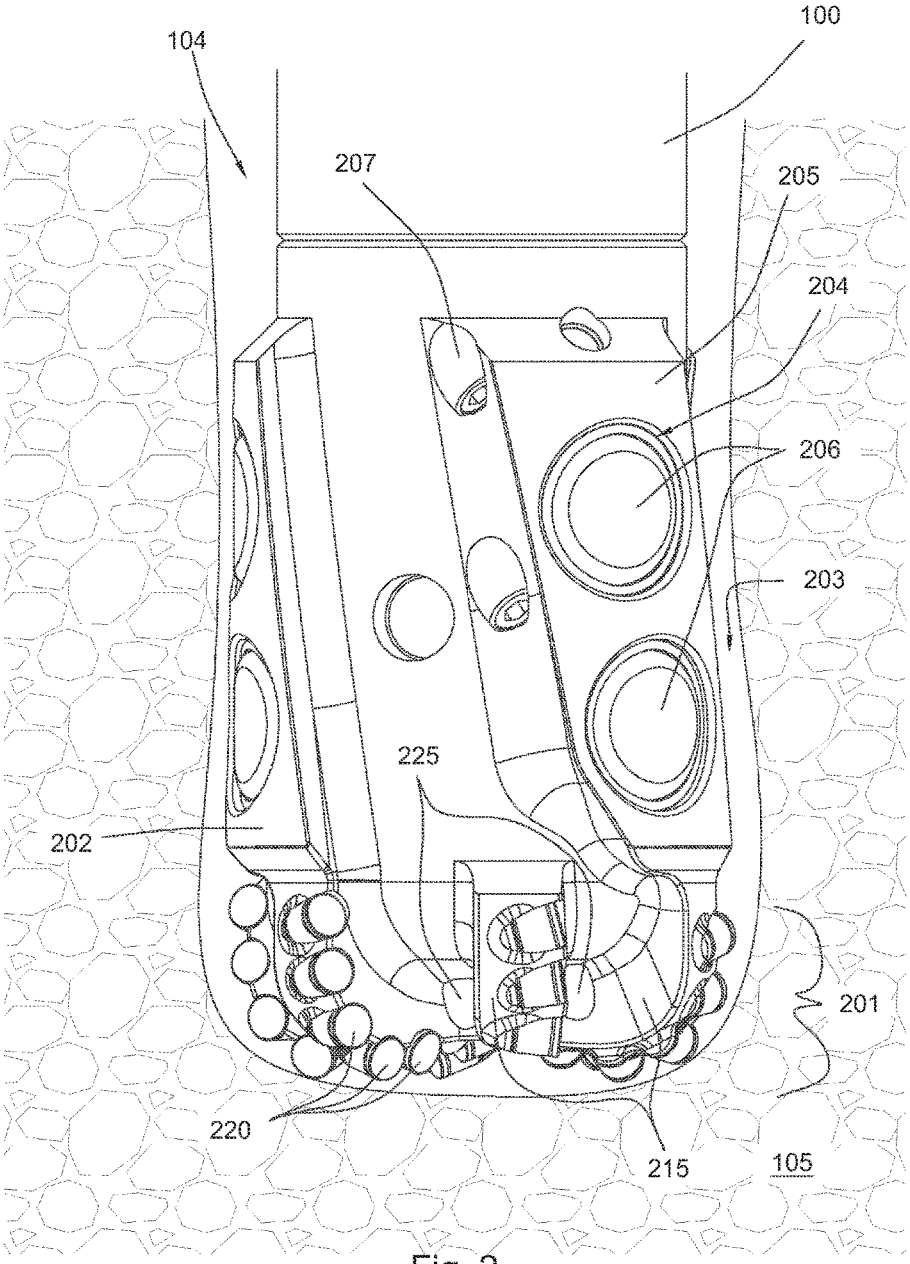
FIG. 2 is an orthogonal view of an embodiment of a drill bit comprising a plurality of pistons disposed on its outer wall.

FIG. 2 discloses an orthogonal view of an embodiment of the drill bit 104 connected to the drill string 100. The drill bit 104 may comprise a cutting face 201 and a gauge surface 202. The drill bit 104 may comprise a plurality of blades 215 converging at a center of the cutting face 201 and diverging at the gauge surface 202. The blades 215 may be equipped with cutting elements 220 configured to degrade the formation 105. Fluid from drill bit nozzles 225 may remove formation fragments from the bottom of the wellbore and carry them up an annulus 203 of the wellbore.

The present embodiment discloses the drill bit 104 configured to be a housing for a piston assembly 204. At least one chamber (hidden from view) may be formed in a wall 205 of the housing on the gauge surface 202. A piston 206 may be disposed within each chamber and may be configured to translate relative to a pin (hidden from view). The pin may be inserted into the piston 206 to retain the piston 206 in the piston assembly 204. The pin may be inserted through at least one entry passageway 207 and attached to the chamber.

The piston assembly 204 may be part of a steering mechanism configured to steer the drill string 100. The piston assembly 204 may steer the drill string 100 by extending and retracting the pistons 206 which may push against the formation 105 forcing the drill string 100 to move in a desired direction. At least one chamber may be disposed relative to a desired turning radius of the drill bit 104. It is believed that the closer the pistons 206 are disposed to the cutting face 201, the greater a build rate can be for the steering mechanism. A 2.5 inch difference in placing the pistons 206 relative to the cutting face 201 may affect the steering capability by approximately 3 degrees per 100 feet. The steering mechanism of the present invention may dispose the pistons closer to the cutting face than the steering mechanisms in the prior art due to the present invention comprising substantially less working parts. Geometry constraints associated with the amount of working parts is a major limitation in placement of the steering mechanisms. The present invention also comprises smaller components that allow for larger junk slot volume leading to less restricted mud flow.

Figure 3:
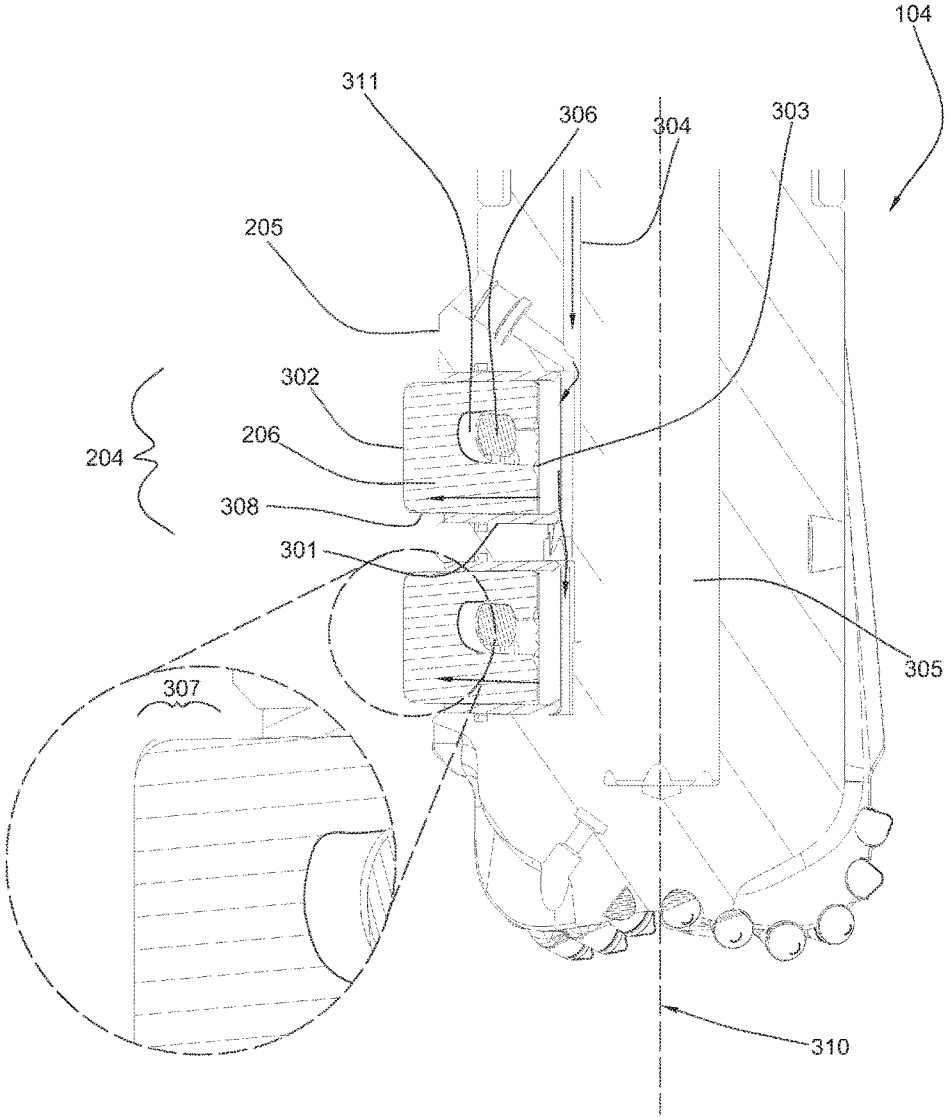
FIG. 3 is a cross-sectional view of an embodiment of a drill bit with a plurality of pistons in an extended position.

FIG. 3 discloses an embodiment of the drill bit 104 comprising at least one piston assembly 204, each piston assembly 204 comprising a chamber 301 and a piston 206 disposed therein. Each chamber 301 may comprise a cylinder or other cavity and may be configured to open to a wall 205. The piston 206 may comprise a working surface 302 adjacent to the wall 205 and configured to come into contact with the formation. The working surface 302 may be convex and configured to match a curvature of the wall 205.

It is believed that a plurality of chambers and pistons disposed in a drill bit may be advantageous in that it provides redundancy. If one piston becomes jammed or dysfunctional, then another piston may not be affected and the piston assembly may still perform effectively. A plurality of pistons may also be configured to actuate independently and/or in combination with each other. By acting independently and/or in combination with each other, the pistons may extend and retract at specified time periods that may maximize the effectiveness of the piston assemblies. In some embodiments, each piston in the plurality may be configured to actuate individually but at determined time intervals which may allow the pistons to work off of each other. In some embodiments, the pistons may act in uniform which may increase the push force on the formation.

The piston 206 may also comprise a base surface 303 disposed opposite the working surface 302 and an intermediate surface 308 joining the working surface 302 and the base surface 303. In some embodiments a retaining passageway 311 may intersect at least one of the intermediate surface and base surface 303. The base surface 303 may be nonplanar and comprise a topography selected from a group consisting of grooves, dimples, flutes, fins, troughs, and protrusions which may be in fluid communication with a fluid source such as a bore 305 via fluid channels 304. The fluid may be drilling mud that is sent through the bore 305 of the drill string during normal operation. A valve (not shown) may redirect a portion of the drilling mud to the fluid channels 304 thus causing the piston 206 to actuate. In some embodiments, the fluid may be air, gas, foam, oil, water, or a combination thereof.

A pin 306 may retain the piston 206 within the chamber 301. The pin 306 may be inserted into the retaining passageway 311 within the piston 206. The pin 306 may allow the piston 206 to translate in a direction normal to a rotational axis 310 of the drill bit 104 but may prevent the piston 206 from rotating within the chamber 301. By preventing the piston 206 from rotating, the degrees of freedom for the piston 206 are decreased to only linear movement. The pin 306 may be comprised of tungsten carbide or other hard material that can withstand the rotational loads that may act upon the piston 206 during normal operations.

Fluid may push the piston 206 into an extended position and the pin 306 may be configured to keep the piston 206 within the chamber 301 by allowing the piston 206 to translate a specified distance. The retaining passageway 311 may comprise an edge or other stopping device that comes into contact with the pin 306 and inhibits further translational movement of the piston 206. The pin 306 may be adjusted to allow the piston 206 to translate within a range of 0.010 inch to 0.500 inch. The present embodiment discloses a magnified view of the piston 206 extending a distance 307 away from the wall 205.

Figure 4:
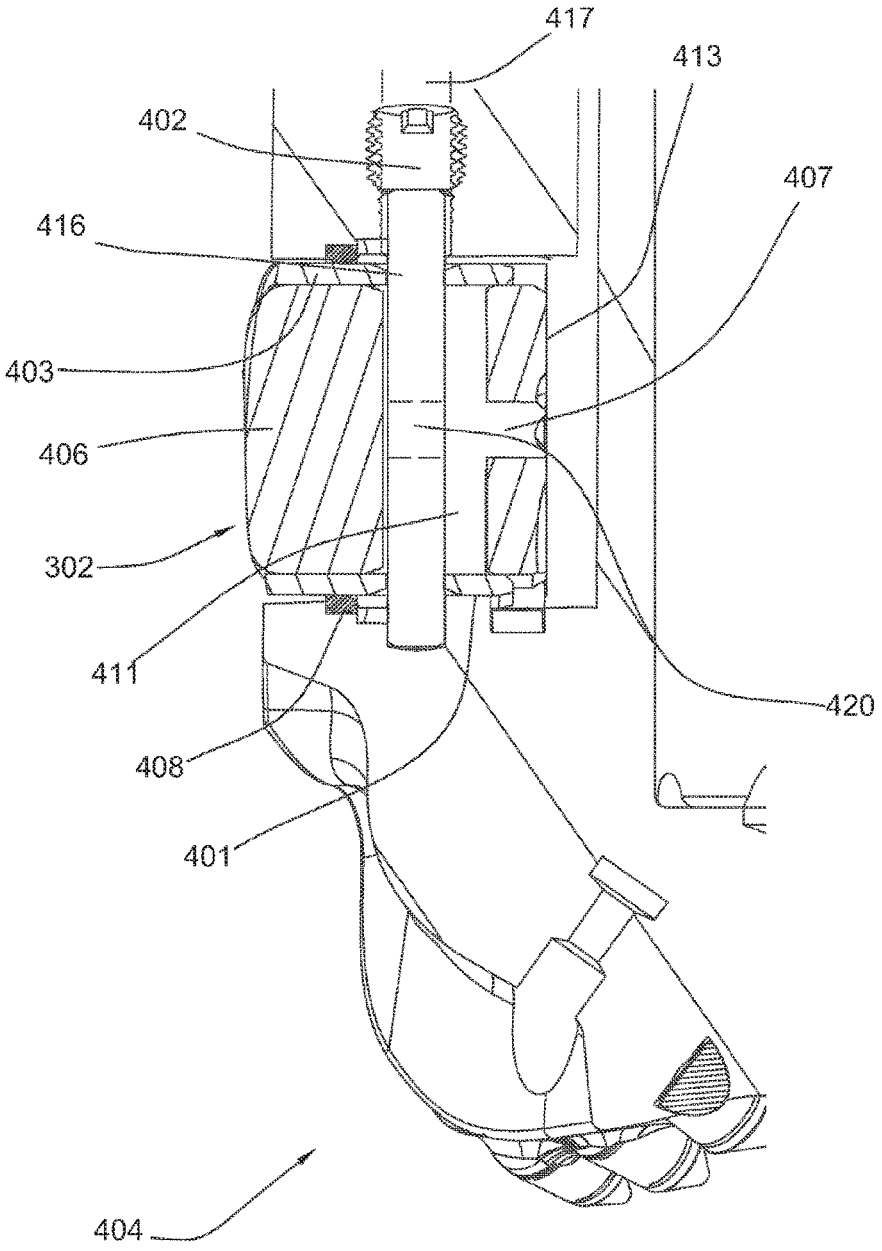
FIG. 4 is a cross-sectional view of an embodiment of a piston disposed within a drill bit.

FIG. 4 discloses another embodiment of a piston 406 disposed in a drill bit 404. This embodiment shows a pin 416 disposed within a retaining passageway 411 in the piston 406 and attached to a chamber 401. The retaining passageway 411 may traverse the piston 406 such that the pin 416 passes through the piston 406. The piston 406 and chamber 401 may comprise openings that allow passage of the pin 406. The pin 406 may be inserted into the retaining passageway 411 through an entry passageway 417 and a plug 402 may be inserted behind the pin 416 to prevent the pin 416 from moving during normal operation.

The chamber 401 may be lined with a sleeve 403 which may also comprise openings to allow passage of the pin 416. The sleeve 403 may comprise a finish that allows the piston 406 to translate without having to overcome a substantial amount of friction. The sleeve 403 may also increase the life of the piston assembly. During normal operation, the piston 406 may translate back and forth causing the sleeve 403 to wear down over time. After the sleeve has worn down a specified amount, the sleeve 403 can be replaced. In other embodiments, the walls of the chamber 401 may be in direct contact with the piston 406. However, when the walls of the chamber 401 are worn down, the whole piston assembly may not be functional.

The piston 406 and sleeve 403 may collectively comprise a tight tolerance, around 0.001 inch diametrical difference between the two, that small particles may be prevented from jamming the system. The piston 406 and the sleeve 403 may be composed of the same material allowing them to maintain the tight tolerance under large temperature changes.

During normal operations when the piston 406 is extending and retracting, fluid may become trapped within the piston 406. The pin 416 may comprise at least one aperture 420 that is configured to allow passage for the trapped fluid. Trapped fluid may be exhausted by an opening to the passageway 407 disposed in a base surface 413 of the piston 406. It is believed to be important to exhaust fluid from inside the piston 406 as trapped fluid may not allow the piston assembly to function properly.

The current embodiment also discloses a seal 408 disposed around the chamber 401. The seal 408 may be disposed between the chamber 401 and the sleeve 403. In other embodiments a seal may be disposed between the chamber and the piston, or the piston and the sleeve. When operating in high pressure environments, fluid may enter or exit the piston assembly between the sleeve 403 and chamber 401. The seal 408 may be configured to prevent fluid from passing through the piston assembly. In some embodiments a seal may not be necessary if the parts of the piston assembly have a tight tolerance; in other embodiments more than one seal may be needed.

Figure 5A:
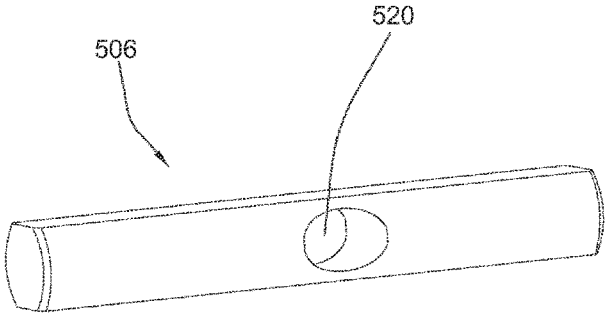
FIG. 5a is a perspective view of an embodiment of a pin with an aperture.
Figure 5B:
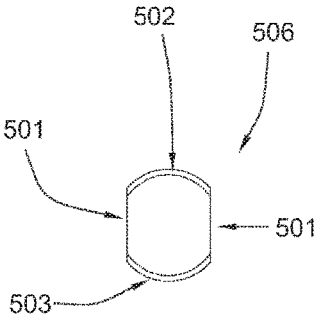
FIG. 5b is a cross-sectional view of an embodiment of a pin.

FIGS. 5a and 5b disclose different views of an embodiment of a pin 506. FIG. 5a discloses a perspective view of the pin 506 comprising an aperture 520. The aperture 520 may be configured to allow trapped fluid to exhaust from the piston assembly.

FIG. 5b discloses a cross-sectional view the pin 506. The pin 506 may have a non-circular or partially circular cross section and may comprise flats 501 along its length. As shown in the present embodiment, a top 502 and bottom 503 may comprise a partially circular cross section and be configured to secure the pin 506 within a piston. The flats 501 may be disposed between the top 502 and bottom 503, may comprise a non-circular cross section, and may be parallel to each other. The flats 501 may be configured to allow the piston to translate a specified distance. In some embodiments, the pin may comprise a cross section selected from the group consisting of a circle, oval, polygon, star, rectangle with circular ends, and annulus.

Figure 5C:
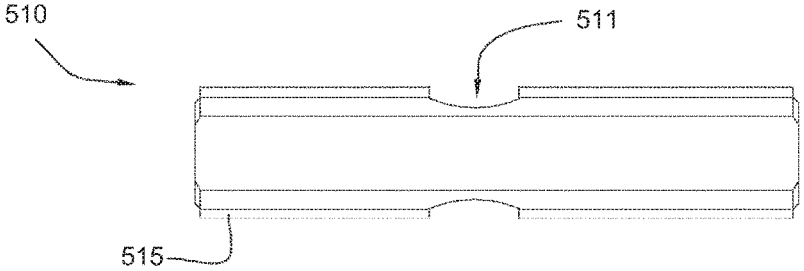
FIG. 5c is an orthogonal view of an embodiment of a pin with a groove.

FIG. 5c discloses an embodiment of a pin 510 comprising a groove 511. The groove 511 may form a smaller cross section than the rest of the pin 510 and may be configured to allow passage of trapped fluid from the piston assembly similar to the aperture as described in FIG. 5a. In this embodiment the pin 510 also comprises a sleeve 515 surrounding at least a portion of the pin 510.

Figure 6A:
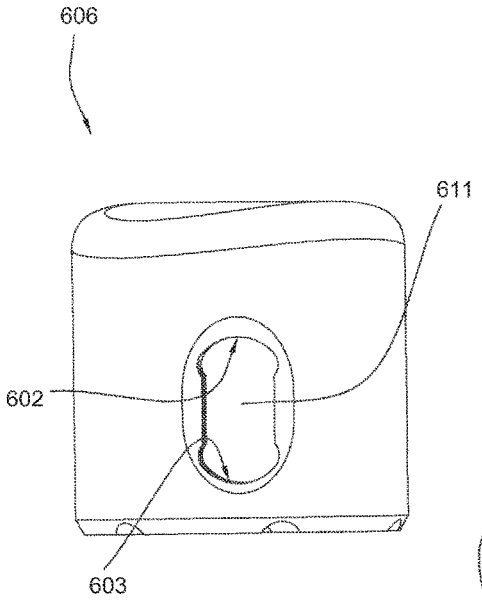
FIG. 6a is an orthogonal view of an embodiment of a piston with a passageway disposed in the center of the piston.
Figure 6B:
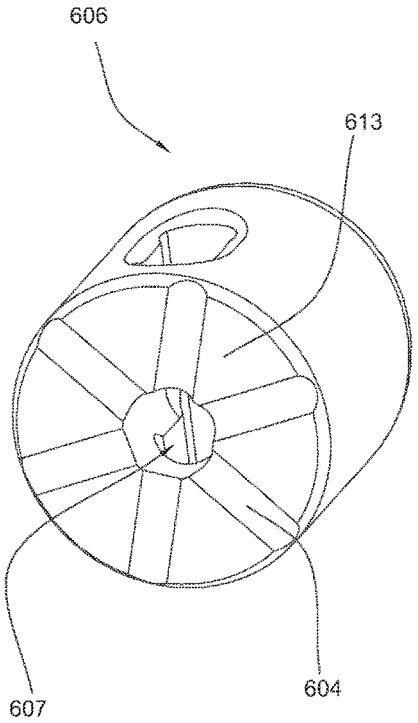
FIG. 6b is a perspective view of another embodiment of a piston.

FIGS. 6a and 6b disclose different views of an embodiment of a piston 606. FIG. 6a discloses the piston 606 comprising a retaining passageway 611. The retaining passageway 611 may comprise a substantially similar shape to a pin and a cross-sectional area greater than a cross-sectional area of the pin. As the piston 606 translates, the pin may limit the translational movement of the piston 606 as the pin comes into contact with a top edge 602 or a bottom edge 603 of the retaining passageway 611.

FIG. 6b discloses a perspective view of an embodiment of the piston 606. The piston 606 may comprise an opening 607 to the retaining passageway 611 and topography on a base surface 613. Fluid channels 604 on the base surface 613 may allow fluid to flow underneath the piston 606 so that the fluid can push the piston 606 into an extended position.

Figure 7A:
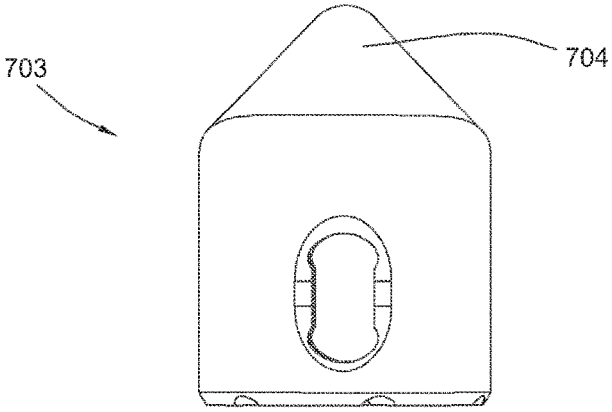
FIG. 7a is an orthogonal view of an embodiment of a piston with a pointed working surface.
Figure 7B:
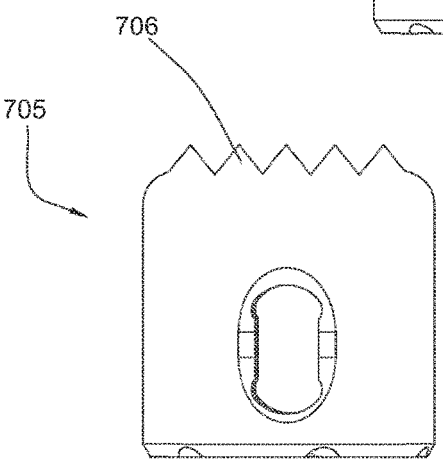
FIG. 7b is an orthogonal view of an embodiment of a piston with a serrated working surface

FIGS. 7a, 7b, 7c, and 7d each disclose alternate embodiments of pistons. FIG. 7a discloses an embodiment of a piston 703 comprising a pointed working surface 704. FIG. 7b discloses an embodiment of a piston 705 comprising a serrated working surface 706. The embodiments disclosed in FIG. 7a and FIG. 7b may be effective when it is desired that the piston grips a formation. An example of when it may be desirable for the piston to grip the formation is when the piston assembly is mounted on a downhole tractor tool.

Figure 7C:
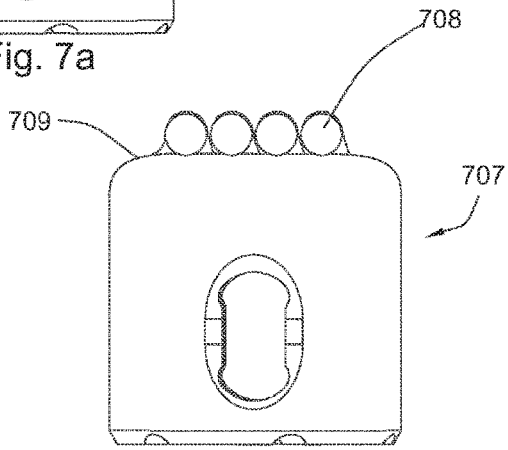
FIG. 7c is an orthogonal view of an embodiment of a piston comprising at least one cutting element.

FIG. 7c discloses an embodiment of a piston 707 comprising at least one cutting element 708 disposed on a working surface 709. The cutting element 708 may contact and degrade a formation. An example of when it may be desirable for the cutting element 708 to be disposed on the working surface 709 is when the piston assembly is mounted on a downhole reamer tool. Cutting elements may be selected from a group consisting of steel, stainless steel, hardened steel, nickel-based alloys, cemented metal carbide, ceramic, diamond, polycrystalline diamond, diamond-like carbon, or combinations thereof.

Figure 7D:
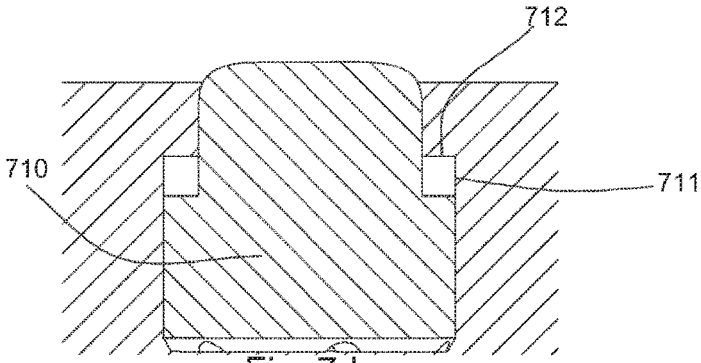
FIG. 7d is an orthogonal view of an embodiment of a piston retained in a tool by a shoulder.

FIG. 7d discloses an embodiment of a piston 710 disposed within a chamber 711. The piston 710 may be retained within the chamber 711 by a shoulder 712.

FIGS. 8a, 8b, 8c, and 8d each disclose different embodiments of a chamber. A chamber may comprise a cross section selected from the group consisting of a circle, oval, polygon, star, rectangle with circular ends, and annulus. A piston may be disposed within each chamber and may comprise a shape similar to that of the chamber.

Figure 8A:
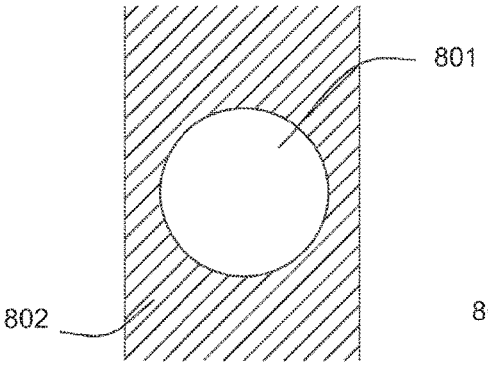
FIG. 8a is an orthogonal view of an embodiment of a chamber comprising a round shape.

FIG. 8a discloses an embodiment of a chamber 801 formed in a wall 802. The chamber 801 comprises a round shape. The round shape may be circular or oval. The round shape may be advantageous in that it may allow a similarly shaped piston to not have sharp points that may be susceptible of breaking during normal drilling operations. The round shape may also provide the maximum contact area for a given perimeter which may allow the piston to contact a formation with the maximum amount of force, and the forces may be distributed to the formation across the greatest area.

Figure 8B:
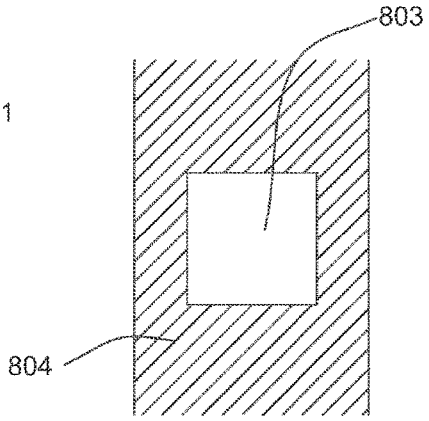
FIG. 8b is an orthogonal view of an embodiment of a chamber comprising a quadrilateral shape.

FIG. 8b discloses an embodiment of a chamber 803 comprising a quadrilateral shape formed in a wall 804. The quadrilateral shape may comprise any shape with four sides including a square and a rectangle. The quadrilateral shape may provide a reasonable amount of surface area for a piston disposed within the chamber 803 to contact a formation.

Figure 8C:
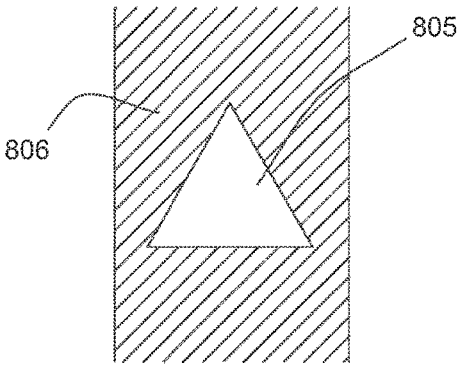
FIG. 8c is an orthogonal view of an embodiment of a chamber comprising a triangular shape.
Figure 8D:
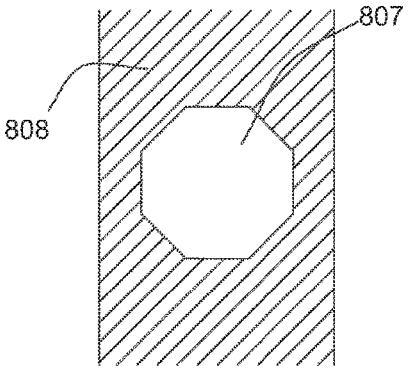
FIG. 8d is an orthogonal view of an embodiment of a chamber comprising a polygonal shape.

FIG. 8c discloses an embodiment of a chamber 805 comprising a triangular shape. The chamber 805 may be formed within a wall 806 and a piston may be disposed therein. The triangular shape may consist of being acute, obese, equilateral, equiangular, isosceles, or combinations thereof. FIG. 8d discloses an embodiment of a chamber 807 formed in a wall 808. The chamber 807 may comprise a polygonal shape; in the current embodiment the chamber 807 comprises an octagonal shape. A polygonal shape may be advantageous in that the chamber 807 may comprise any number of sides allowing the chamber 807 and piston to be formatted to have the most effective shape for a given application.

FIGS. 9a, 9b, 9c, 9d, 9e, and 9f disclose different embodiments of a piston comprising at least one opening configured to allow passage of at least one pin. The functions of the at least one pin are to keep the piston inside the piston assembly and to disallow the piston from rotationally moving.

Figure 9A:
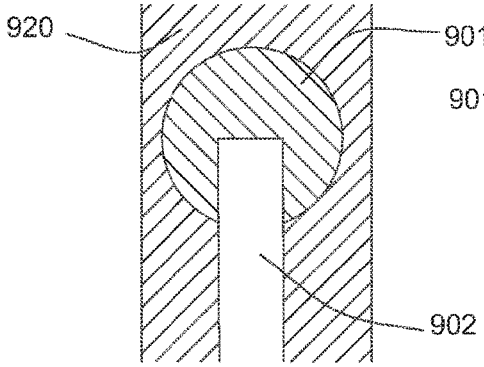
FIG. 9a is a cross-sectional view of an embodiment of piston with a pin intruding therein.
Figure 9B:
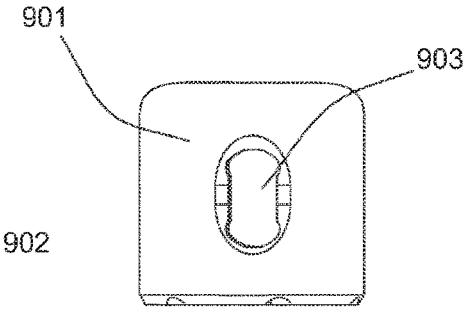
FIG. 9b is an orthogonal view of an embodiment of a piston comprising an opening for the intruding pin.

FIGS. 9a and 9b disclose different views of an embodiment comprising a pin 902 intruding but not passing through a piston 901. FIG. 9a shows across-sectional view of the piston 901 disposed within a wall 920 and with a pin 902 partially disposed within the piston 901. In some embodiments, a plurality of pins may each be disposed partially within a piston at different angles around the piston. FIG. 9b shows an orthogonal view of the piston 901 comprising a retaining passageway 903. The retaining passageway 903 may allow passage of the pin 902 to be partially disposed within the piston 901.

Figure 9C:
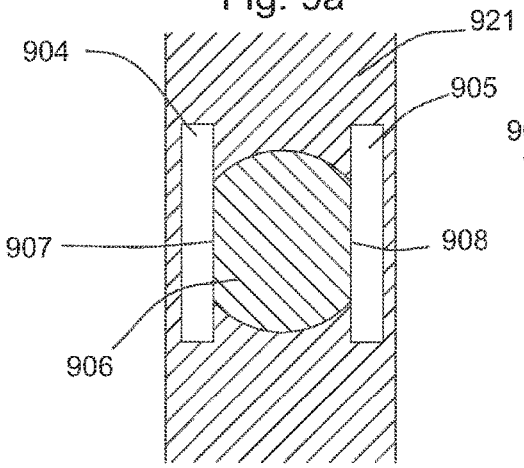
FIG. 9c is a cross-sectional view of an embodiment of a piston with two pins disposed on opposite edges of the piston.
Figure 9D:
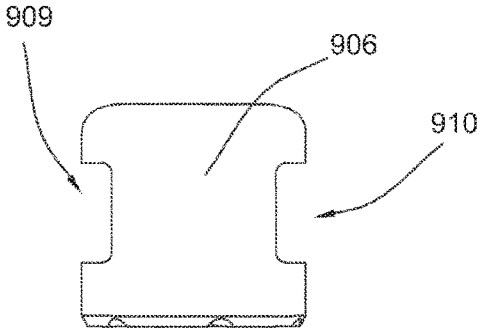
FIG. 9d is an orthogonal view of an embodiment of a piston with two recesses disposed on opposite edges of the piston.

FIGS. 9c and 9d disclose different views of an embodiment comprising two pins 904 and 905 disposed on opposite edges of a piston 906. FIG. 9c shows a cross-sectional view of the piston 906 disposed within a wall 921. Each pin 904 and 905 may comprise an inner side 907 and 908 respectively, that may pass through the piston 906 while the rest of each pin 904 and 905 is connected to the wall 921. FIG. 9d shows an orthogonal view of the piston 906 comprising two retaining passageways 909 and 910. The retaining passageways 909 and 910 may be disposed on opposite edges of the piston 906 and may be configured to allow passage to the pins 904 and 905 respectively.

Figure 9E:
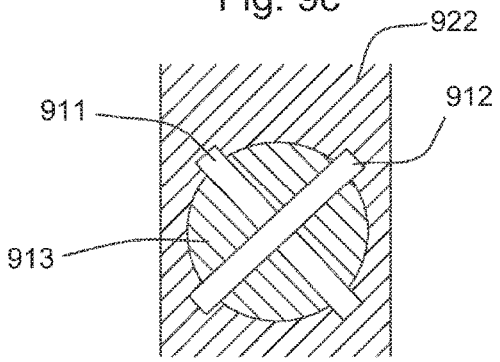
FIG. 9e is a cross-sectional view of an embodiment of a piston with two pins disposed therein and perpendicular with respect to each other.
Figure 9F:
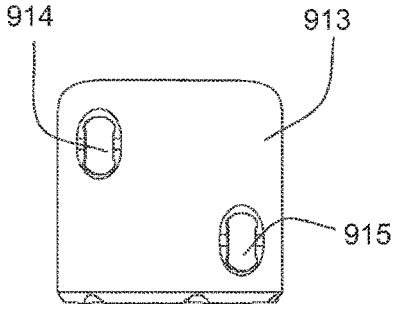
FIG. 9f is an orthogonal view of an embodiment of a piston with two openings for the perpendicular pins.

FIGS. 9e and 9f disclose different views of an embodiment comprising two pins 911 and 912 passing through a piston 913 disposed within a wall 922. The pins 911 and 912 may each pass through the center of the piston 913 and may be disposed perpendicular with respect to each other. It is believed that the two pins 911 and 912 may effectively keep the piston 913 from rotating during normal drilling operations. FIG. 9f shows an orthogonal view of the piston 913 comprising two retaining passageways 914 and 915. The retaining passageways 914 and 915 may be configured to allow passage to the pins 911 and 912 respectively. The retaining passageways 914 and 915 may need to be disposed one higher than the other in order for both pins to pass through the piston 913.

Figure 10:
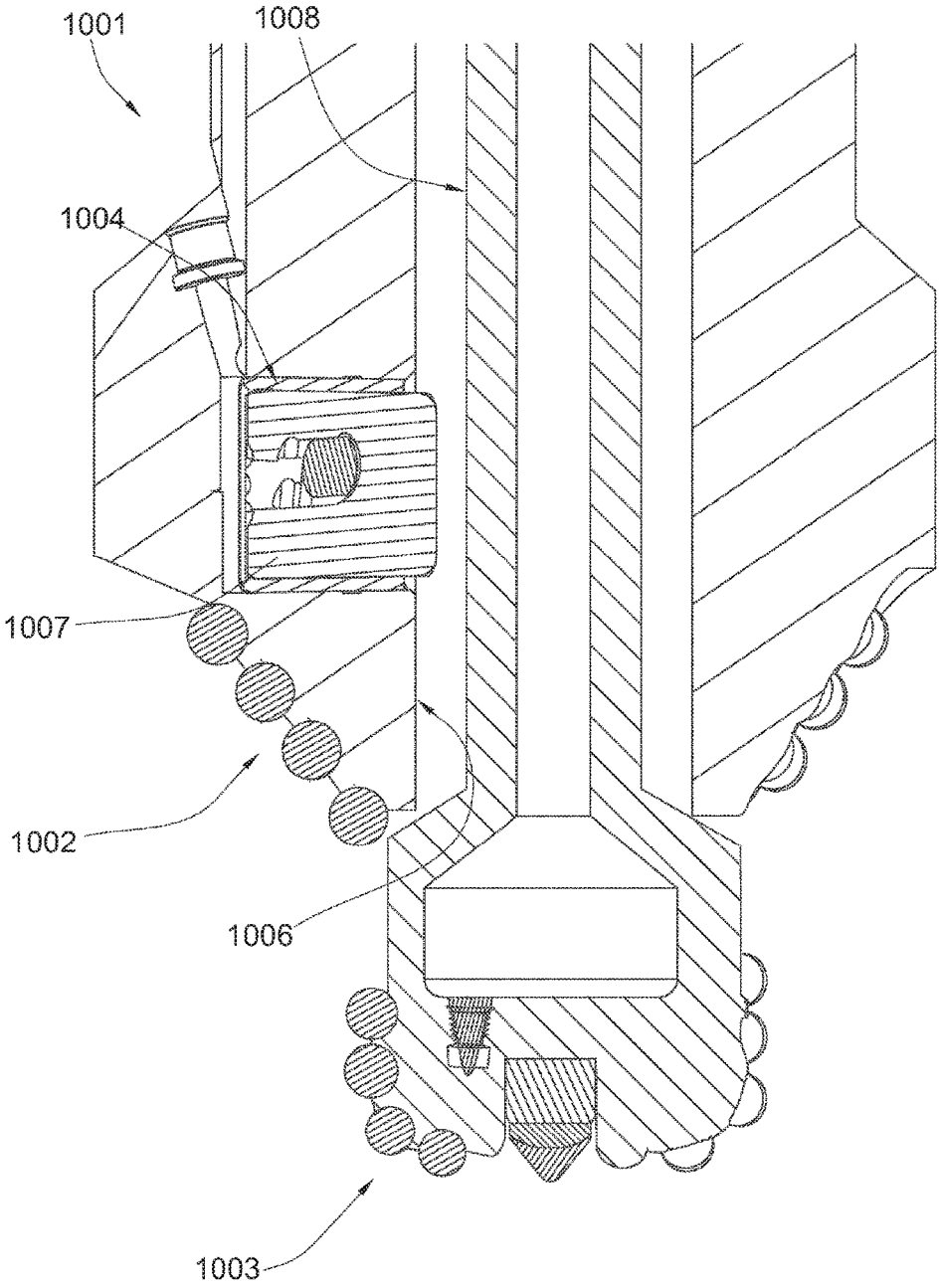
FIG. 10 is a cross-sectional view of an embodiment of a drill bit assembly with a piston disposed within and configured to push against an inner bit.

FIG. 10 discloses a cross-sectional view of an embodiment of a drill bit assembly 1001 comprising an outer bit 1002 and an inner bit 1003. The inner bit 1003 may protrude from the outer bit 1002 such that the inner bit 1003 may be the first to come into contact with a formation. The inner bit 1003 may be advantageous in that it may weaken the formation before the outer bit 1002 begins to degrade the formation. The inner bit 1003 may also be configured to rotationally move and thus steer the drill string.

In the present embodiment, a housing comprises a tube and at least one chamber 1004 may be formed in an inside wall 1006 within the tube. The chamber 1004 may open to the inside wall 1006 thus allowing a piston 1007 disposed within the chamber 1004 to come into contact with a body 1008 of the inner bit 1003. As the piston 1007 extends and retracts, the piston 1007 may push the body 1008 of the inner bit 1003 thus rotationally moving the inner bit 1003 and steering the drill string.

FIGS. 11, 12, 13, and 14 each disclose different embodiments of a plurality of pistons disposed in different housings wherein the housings comprise a tube or drill string, and the wall may be disposed on a surface of the tube. The housings may be selected from a group consisting of drill bits, calipers, reamers, shock absorbers, jars, clamps, tractors, stabilizers, fishing tools, or combinations thereof.

The present embodiments disclose the pistons forming at least one extendable arm that is configured to extend away from the drill string and come into contact with a formation. The pistons may be configured to translate in a direction normal to a rotational axis of the housing and may be configured to actuate independently or in combinations with each other.

Figure 11:
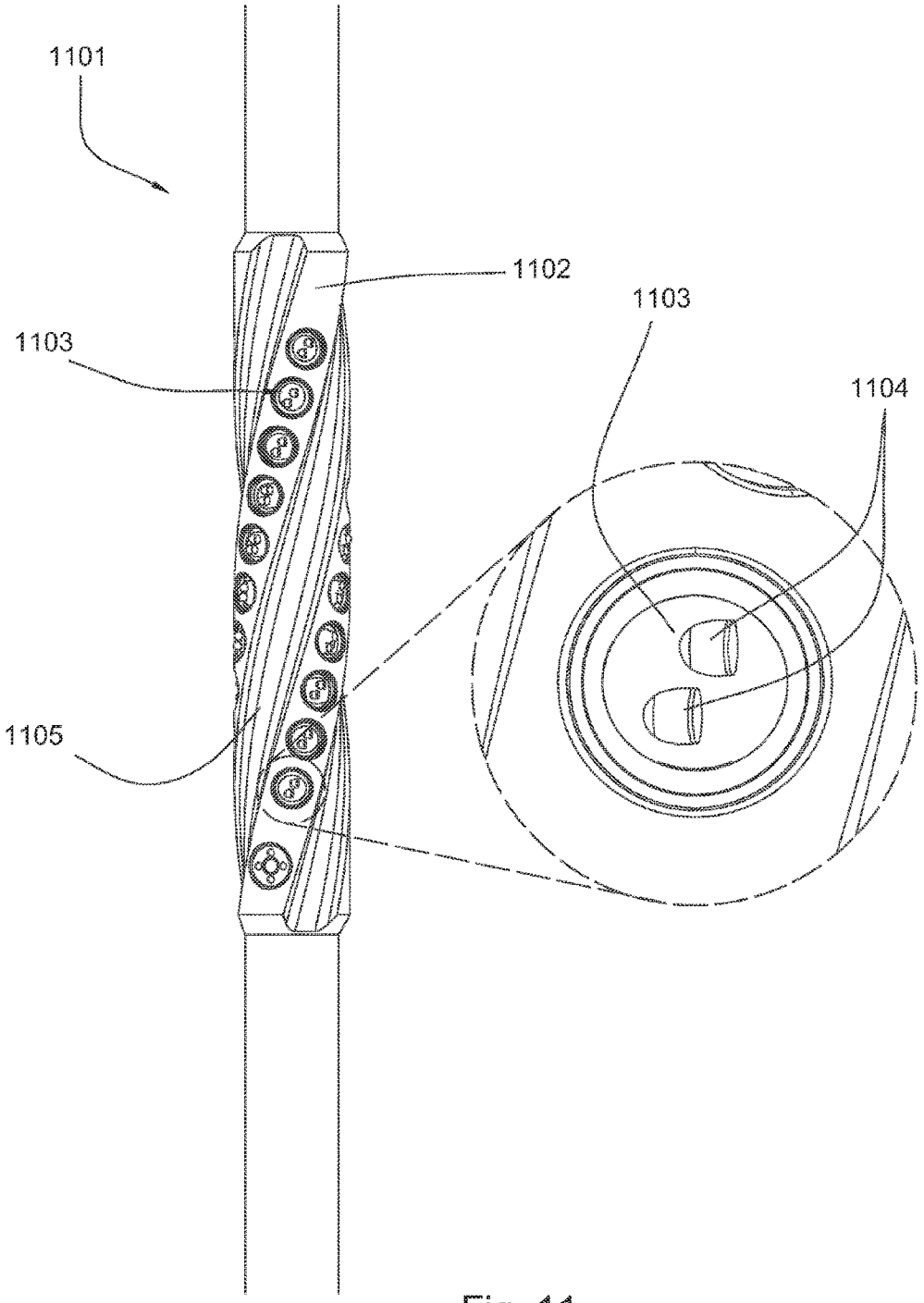
FIG. 11 is an orthogonal view of an embodiment of a plurality of pistons disposed on a drill string forming a reamer tool.

FIG. 11 discloses an embodiment of a drill string 1101 comprising at least one piston 1103 disposed in at least one wall 1102. The wall 1102 may have a greater diameter than a diameter of the drill string 1101. The piston 1103 may comprise a plurality of cutting elements 1104 and the cutting elements 1104 may be configured to contact and degrade a formation. With the cutting elements 1104 configured to degrade the formation, the piston 1103 may form a reamer which when in an extended position may enlarge the diameter of a wellbore. There are many instances in drilling operations, such as a collapse of the wellbore, that it is desirable for the wellbore diameter to be enlarged. The piston 1103 may extend and the drill string 1101 may rotate causing the cutting elements 1104 to degrade the formation.

Valleys 1105 may be formed between walls. The valleys 1105 may allow drilling mud and debris to travel between the drill string 1101 and the formation during normal drilling operations. The wall 1102 may be configured to partially curve or spiral around the drill string 1101. The valleys 1105 may thus also curve or spiral around the drill string 1101 which may force the drilling mud and debris to spiral around the drill string 1101 as it travels up the annulus of the wellbore. By spiraling, the drilling mud may exert forces on the drill string 1101 which may help the drill string 1101 rotate.

Figure 12:
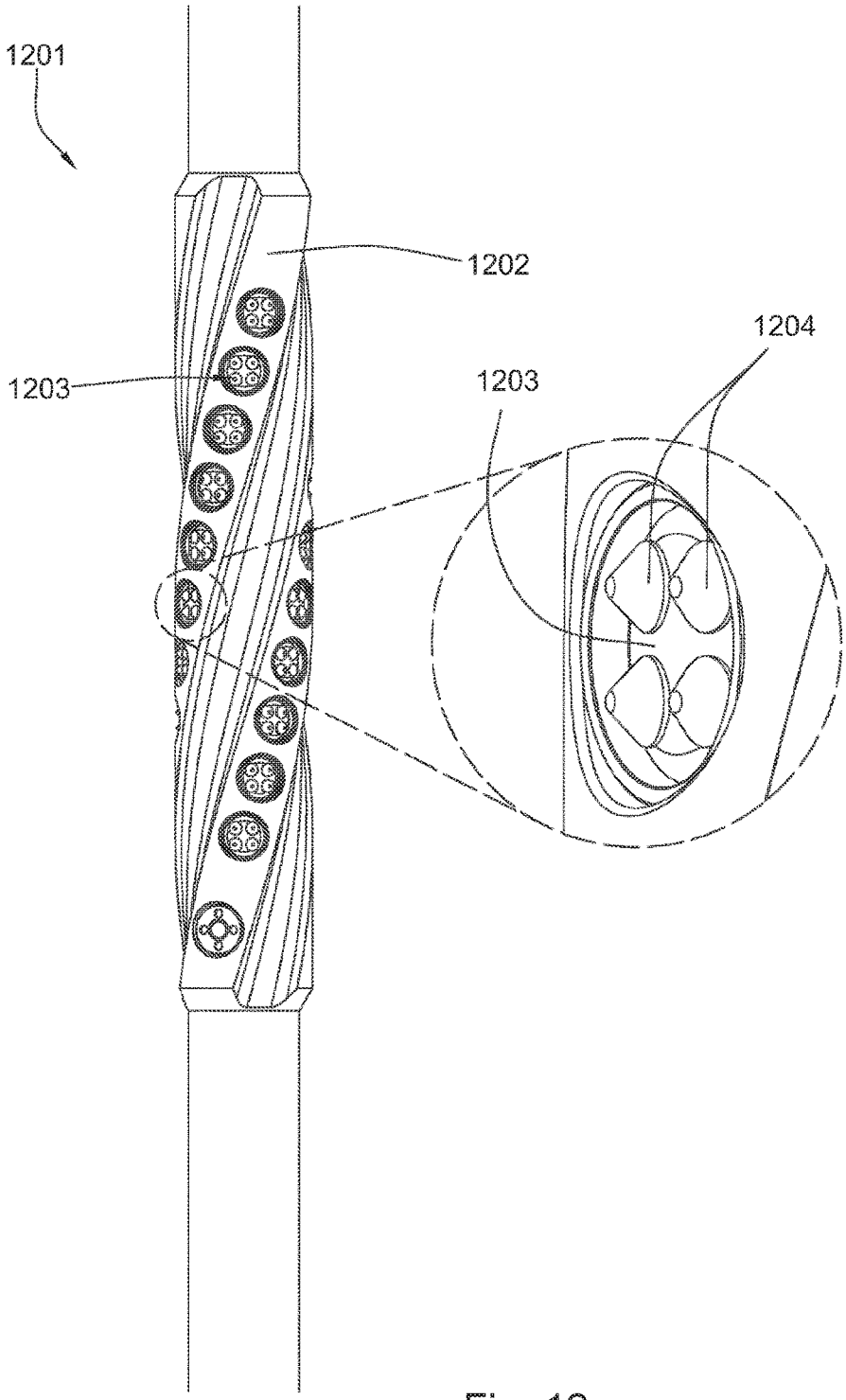
FIG. 12 is an orthogonal view of an embodiment of a plurality of pistons disposed on a drill string forming a clamping tool.

FIG. 12 discloses an embodiment of a drill string 1201 comprising at least one piston 1203 disposed in at least one wall 1202. Each piston 1203 may comprise a plurality of cutting elements 1204 and the cutting elements 1204 may be configured to grip a formation. As shown in the embodiment, the cutting elements 1204 may comprise a conical shape that is used to penetrate and clamp onto the formation. By clamping onto the formation, a portion of the drill string 1201 below the piston 1203 may become isolated from a portion of the drill string 1201 above the piston 1203. The isolated portion of the drill string 1201 may not be subject to the rotational forces applied to the top portion of the drill string 1201 by a top drive disposed at the surface and thus be able to rotate as desired from motors or other power devices disposed in the isolated portion.

The piston 1203 may also be configured to clamp onto the formation with maximum efficiency due to the ability of the piston 1203 to actuate independently of other pistons. The formation may not comprise an even surface for the piston 1203 to clamp onto so actuating independently may allow the piston 1203 to clamp onto as much of the formation as possible.

Incorporated into the piston 1203 may be a formation hardness testing mechanism. It is believed that the type of formation may be determined by measuring its hardness. The piston 1203 may extend and the cutting elements 1204 may contact the formation. The forces applied to the piston 1203 and the amount the cutting elements 1204 penetrate into the formation may be used to determine the hardness of the formation.

The piston 1203 may be configured to work in combination with each other such that the piston 1203 may push on one side of the formation forcing the drill string 1201 against the opposite side. Forcing the drill string 1201 against one side of the formation may be desirable when measurements, such as resistivity or seismic, are taken. With the drill string 1201 in contact with the formation, the measurements may be able to better identify signals as they propagate through the formation.

Figure 13:
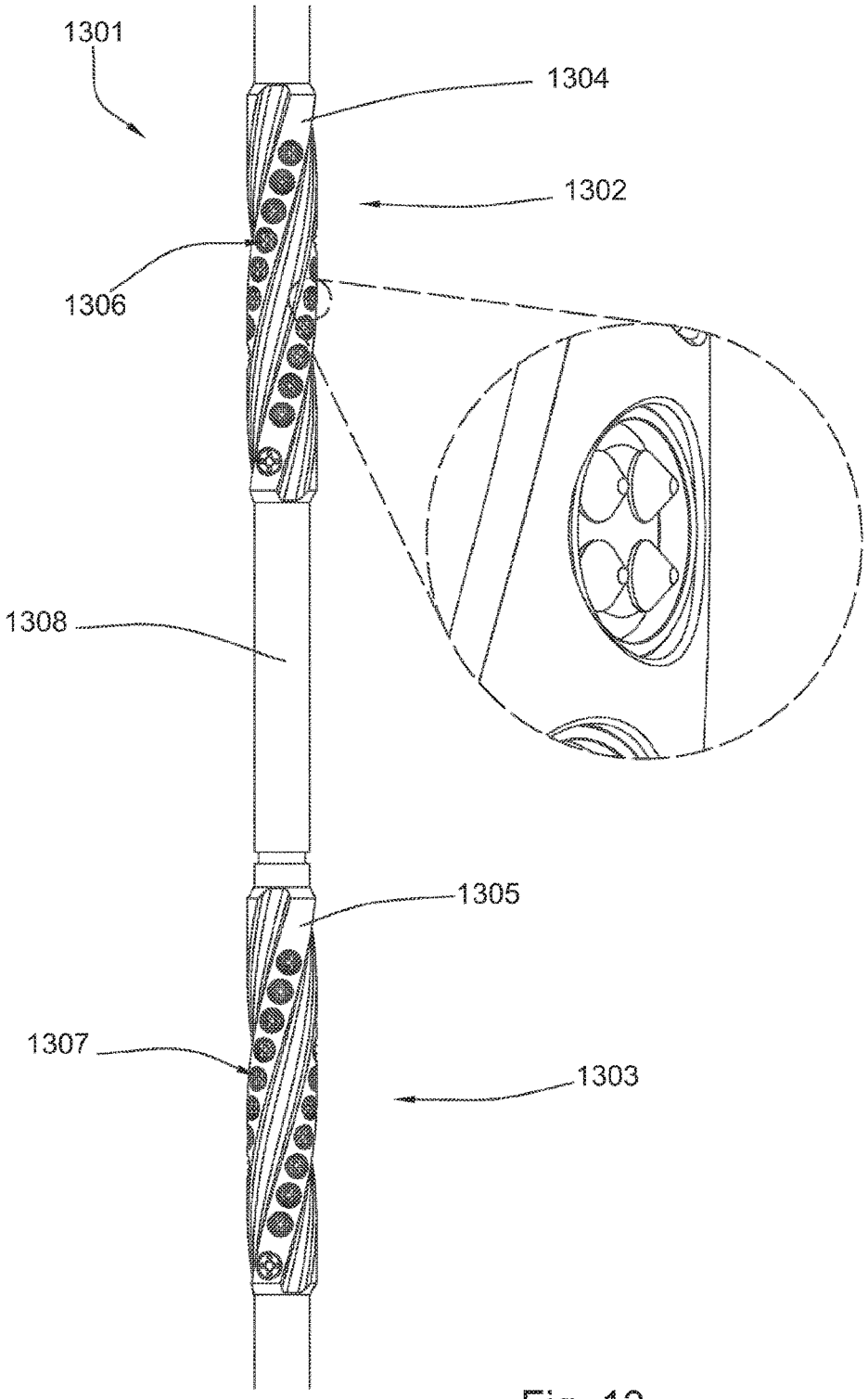
FIG. 13 is an orthogonal view of an embodiment of a plurality of pistons disposed on a drill string forming a crawler tool.

FIG. 13 discloses a drill string 1301 comprising walls in a plurality of different locations along the drill string 1301. In this embodiment, two locations on the drill string 1301 each comprise at least one wall. A top location 1302 may be disposed closer to the surface, and a bottom location 1303 may be disposed closer to the drill bit. Each location may comprise walls 1304 and 1305 respectively with a plurality of pistons 1306 and 1307 disposed thereon. The pistons 1306 and 1307 at each location may comprise cutting elements that may be configured to grip into a formation. The plurality of locations 1302 and 1303 may operate mutually to form a crawler or tractor tool. A portion of the drill string 1308 may be disposed between the top and bottom locations 1302 and 1303 and may comprise telescoping capabilities. The crawler or tractor tool may function by the pistons 1306 in the top location 1302 extending and clamping onto the formation. Motors and other power devices may move the bottom location 1303 further into the wellbore and the telescoping portion of the drill string 1308 may elongate. After the bottom location 1303 has moved a desired amount, the pistons 1307 in the bottom location 1303 may extend and clamp onto the formation. The pistons 1306 in the top location 1302 may then retract and the telescoping portion of the drill string 1308 may contract. Through these movements, the drill string 1301 may move to a desired position within the wellbore.

In some embodiments, sensors, such as resistivity or seismic sensors may also be disposed within the telescoping portion of the drill string. The pistons at each location may extend and clamp onto the formation. The sensors disposed between the top location and the bottom location may identify signals traveling through the formation because of the contact of the top and bottom locations with the formation. The signals may propagate through the formation and pistons to the sensors.

Figure 14:
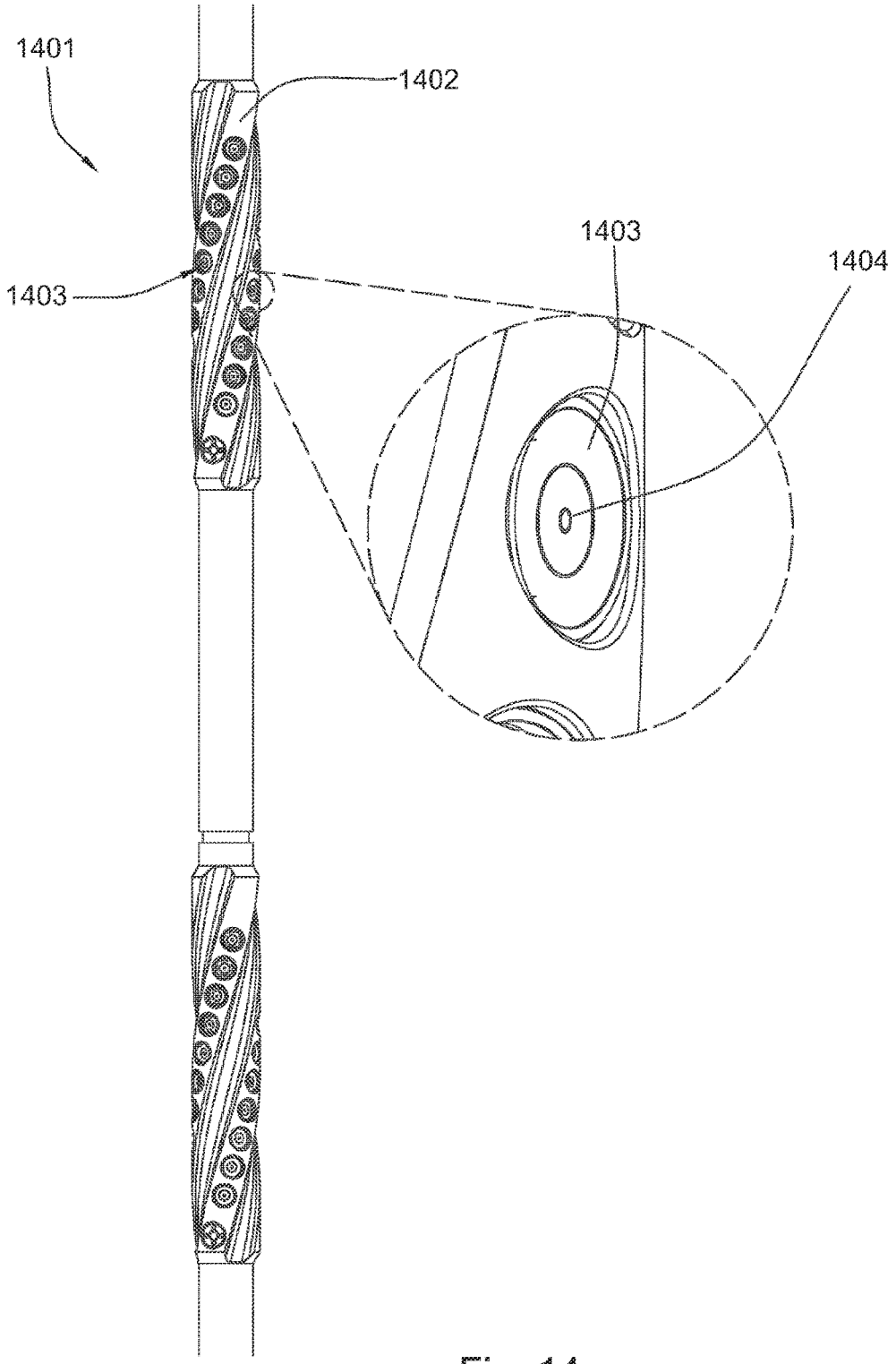
FIG. 14 is an orthogonal view of an embodiment of a plurality of pistons disposed on a drill string and the pistons comprise at least one sensor.

FIG. 14 discloses an embodiment of a drill string 1401 comprising at least one piston 1403 disposed in at least one wall 1402. The piston 1403 may comprise at least one sensor 1404. The at least one sensor may come from a group consisting of pressure transducers, linear displacement variable transformers (LDVTs), resistivity sensors, seismic sensors, or combinations thereof. The piston 1403 may extend and contact the formation allowing the sensor 1404 to gather information from the formation.

In some embodiments, the piston 1403 may comprise calipers that may be configured to measure the distance that the piston 1403 extended before contacting the formation. Because the piston 1403 may act independently of other pistons, the diameter of the wellbore at the locations of the piston 1403 may be accurately measured.

Figure 15:
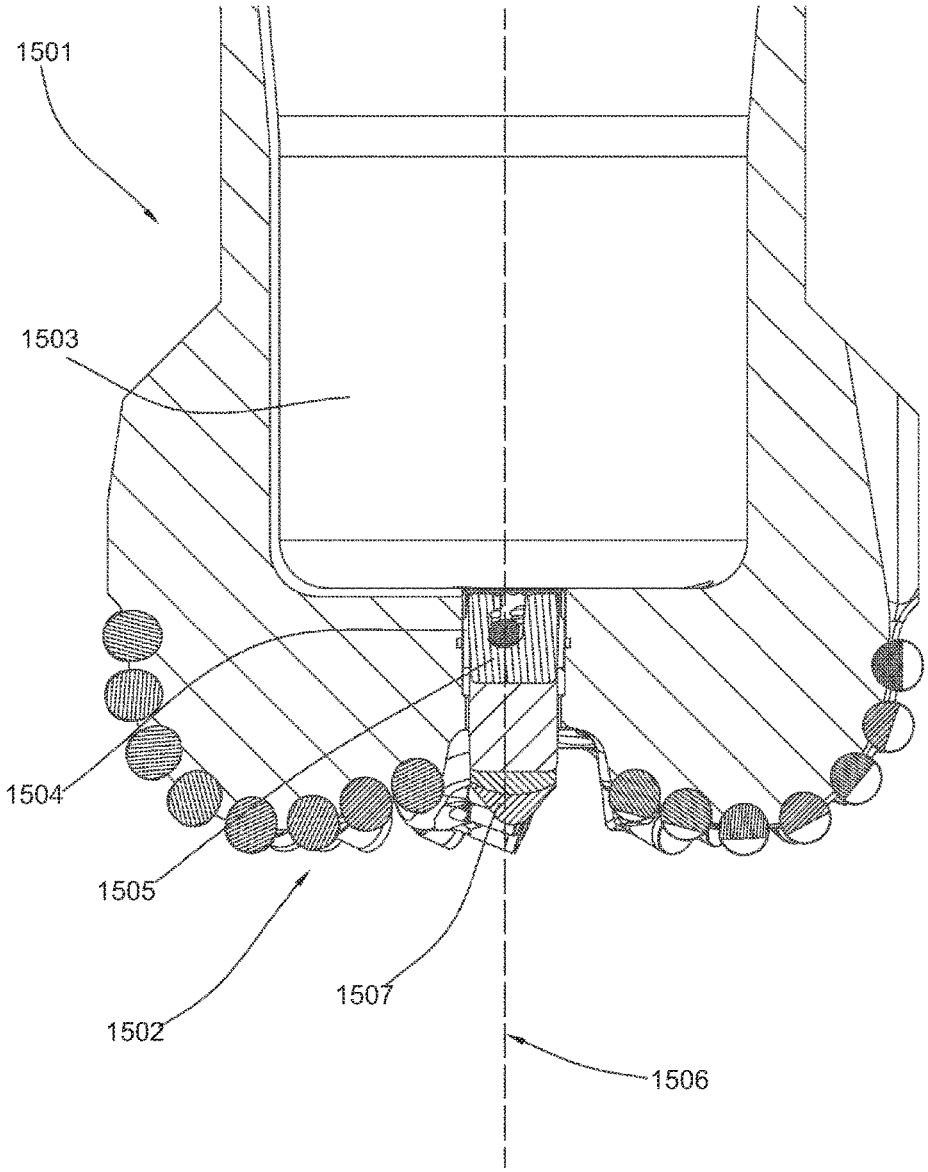
FIG. 15 is a cross-sectional view of an embodiment of piston disposed within a cutting face of a drill bit.

FIG. 15 discloses a cross-sectional view of an embodiment of a drill bit 1501 comprising a cutting face 1502. The drill bit 1501 may also comprise a bore 1503 through which drilling fluid may travel. At least one chamber 1504 may be formed on the bore 1503 such that it opens to the cutting face 1502. A piston 1505 may be disposed within the chamber 1504 and be configured to translate in a direction parallel to a rotational axis 1506 of the drill bit 1501. The piston 1505 may comprise an indenting element 1507 configured to contact the formation as the piston 1505 extends and retracts.

Whereas the present invention has been described in particular relation to the drawings attached hereto, it should be understood that other and further modifications apart from those shown or suggested herein, may be made within the scope and spirit of the present invention.

What is claimed is:

1. A piston assembly, comprising:

a housing comprising a wall;

at least one chamber formed in the wall;

a piston disposed within the chamber[; wherein the piston comprises], *the piston including* a working surface adjacent the wall, a base surface opposite the working surface, and an intermediate surface joining the working surface and the base surface*, the piston including a first passageway intersecting the intermediate surface, the intermediate surface enclosing a top edge and a bottom edge of the first passageway*;

[at least one passageway through the piston;]

wherein the base surface comprises an opening to [the] *a second* passageway; *and*

[at least one] *a* pin [disposed within the passageway and attached to the chamber; and wherein] *passing into the first passageway,* the *entire* piston [is] *being* free to [translate] *move* relative to the pin.

2. The assembly of claim 1, wherein the chamber is in fluid communication with a fluid source.

3. The assembly of claim 1, wherein the housing is selected from a group consisting of drill bits, calipers, reamers, shock absorbers, jars, clamps, tractors, stabilizers, fishing tools, and combinations thereof.

4. The assembly of claim 3, wherein the housing consists of a drill bit and the wall and the chamber are disposed on a gauge surface of the drill bit.

5. The assembly of claim 1, wherein the housing comprises a tube and the wall is disposed within the tube.

6. The assembly of claim 1, wherein the housing comprises a tube and the wall is disposed on a surface of the tube.

7. The assembly of claim 1, wherein the chamber comprises a cross section selected from the group consisting of a circle, oval, polygon, star, rectangle with circular ends, and annulus.

8. The assembly of claim 1, wherein the piston comprises a cross sectional shape similar to the chamber.

9. The assembly of claim 1, wherein the chamber comprises openings to allow passage of the pin and fluid communication with the chamber.

10. The assembly of claim 1, wherein the chamber is lined with a sleeve and the sleeve comprises openings to allow passage of the [at least one] pin.

11. The assembly of claim 1, wherein the *first* passageway intersects [at least one of the intermediate surface and] *the* base surface.

12. The assembly of claim 1, wherein the working surface comprises wear resistant elements disposed thereon.

13. The assembly of claim 1, wherein the base surface is nonplaner and comprises a topography selected from the group consisting of grooves, dimples, flutes, fins, troughs, and protrusions.

14. The assembly of claim 1, wherein the pin comprises a cross section selected from the group consisting of a circle, oval, polygon, star, rectangle with circular ends, and annulus.

15. The assembly of claim 1, wherein the pin comprises an aperture there through.

16. The assembly of claim 1, wherein the pin comprises a sleeve surrounding at least a portion of the pin.

17. The assembly of claim 1, wherein the *first* passageway comprises a cross-sectional area greater than a cross-sectional area of the pin.

18. The assembly of claim [1] *10*, further comprising a seal disposed between the chamber and the piston, the piston and the sleeve, or the chamber and the sleeve.

*19. The assembly of claim 1, the first passageway traversing the piston.*

*20. The assembly of claim 19, the pin passing through the piston.*

*21. The assembly of claim 19, the first passageway including a top edge and a bottom edge, the piston being free to move relative to the pin to until pin contacts the top edge or the bottom edge.*

*22. The assembly of claim 1, the pin including a plurality of pins and the first passageway including a plurality of passageways, the plurality of pins passing into the plurality of passageways in the piston.*

*23. The assembly of claim 22, the plurality of pins being disposed within the piston at different angles around the piston.*

*24. The assembly of claim 22, each pin of the plurality of pins having an inner side and an outer side, the inner side passing through the piston and the outer side being connected to the wall.*

*25. The assembly of claim 22, at least two pins of the plurality of pins passing through a center of the piston.*

*26. The assembly of claim 22, at least two pins of the plurality of pins being perpendicular with respect to each other.*

*27. The assembly of claim 26, a first pin of the plurality of pins being disposed higher than a second pin of the plurality of pins.*

*28. The assembly of claim 1, the pin being adjustable to allow the piston to translate within a range of 0.010 inches to 0.500 inches.*

*29. The assembly of claim 10, the sleeve having a tolerance of 0.001 inches between the sleeve and the piston.*

*30. The assembly of claim 10, the sleeve and the piston being composed of the same material.*

*31. The assembly of claim 15, the aperture being a groove forming a smaller cross section than the pin.*

*32. The assembly of claim 1, the working surface being pointed.*

*33. The assembly of claim 1, the working surface including a cutting element.*

*34. The assembly of claim 1, further comprising a second piston disposed within the wall and configured to translate relative to the housing.*

*35. The assembly of claim 34, the second piston being angularly aligned with the piston relative to a longitudinal axis of the housing.*

*36. The assembly of claim 34, the second piston being offset from the piston in a direction of a longitudinal axis of the housing, at least a part of the second piston overlapping at least a part of the first piston about the longitudinal axis.*

*37. The assembly of claim 34, the piston being configured to translate independently of the second piston.*

*38. The assembly of claim 1, the piston being free to move relative to the pin at a specific time period.*

*39. The assembly of claim 1, the pin configured to limit movement of the piston relative to the housing.*

*40. The assembly of claim 1, the working surface being oriented toward a longitudinal axis of the housing.*

*41. A method for using the piston assembly of claim 1, comprising:*

*directing a portion of a fluid to the chamber;*

*moving the piston relative to the pin; and*

*stopping the moving of the piston relative to the pin by a contact of the pin with an edge of the first passageway.*

*42. The method of claim 41, further comprising exhausting fluid from the first passageway through an aperture in the pin.*

*43. The method of claim 41, wherein moving the piston relative to the pin includes moving the piston perpendicular to a rotational axis of the housing within a range of 0.010 inches to 0.500 inches.*

*44. The method of claim 41, wherein moving the piston relative to the pin includes preventing the piston from rotating within the chamber.*

* * * * *